UNITED STATES PATENT OFFICE.

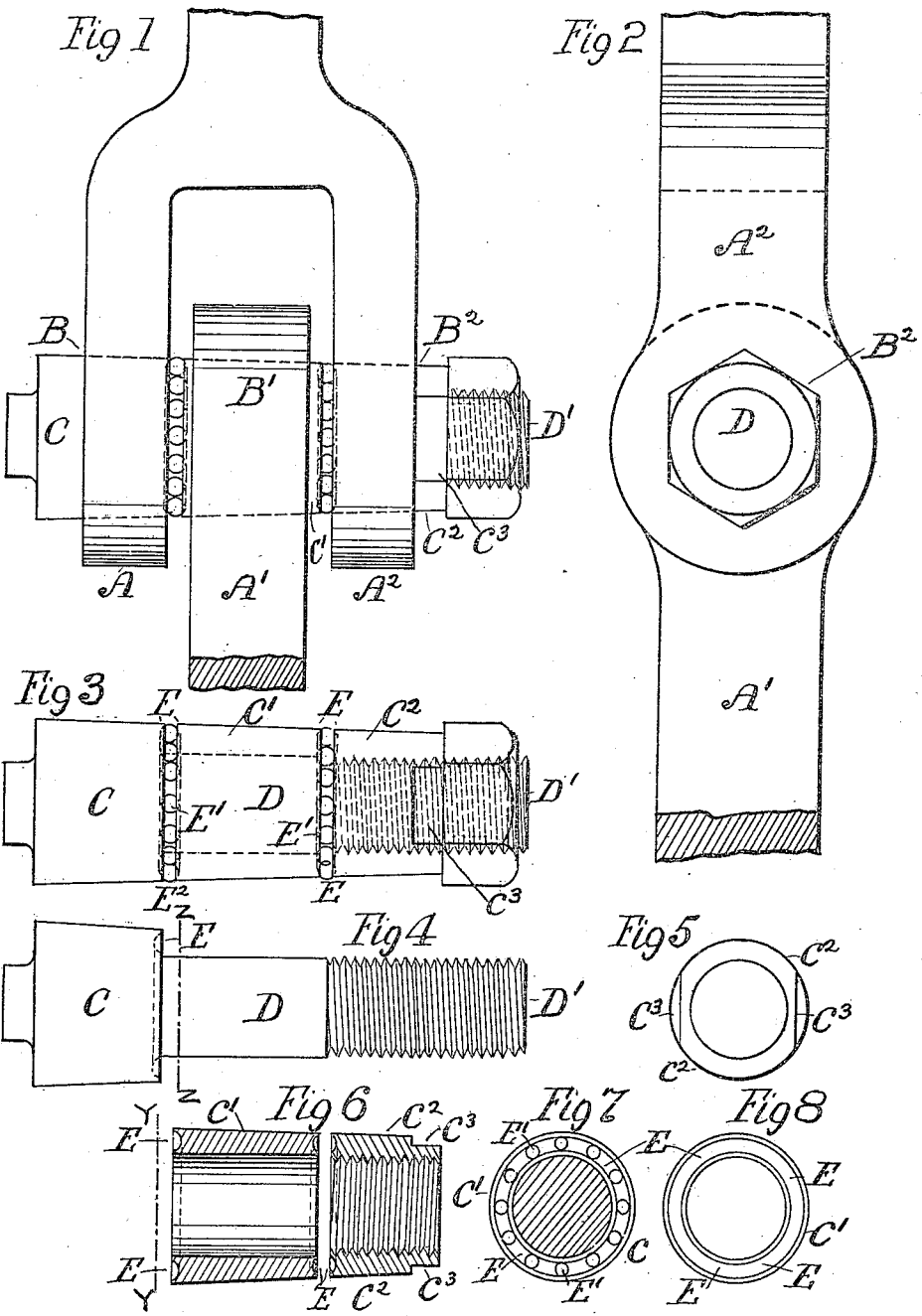

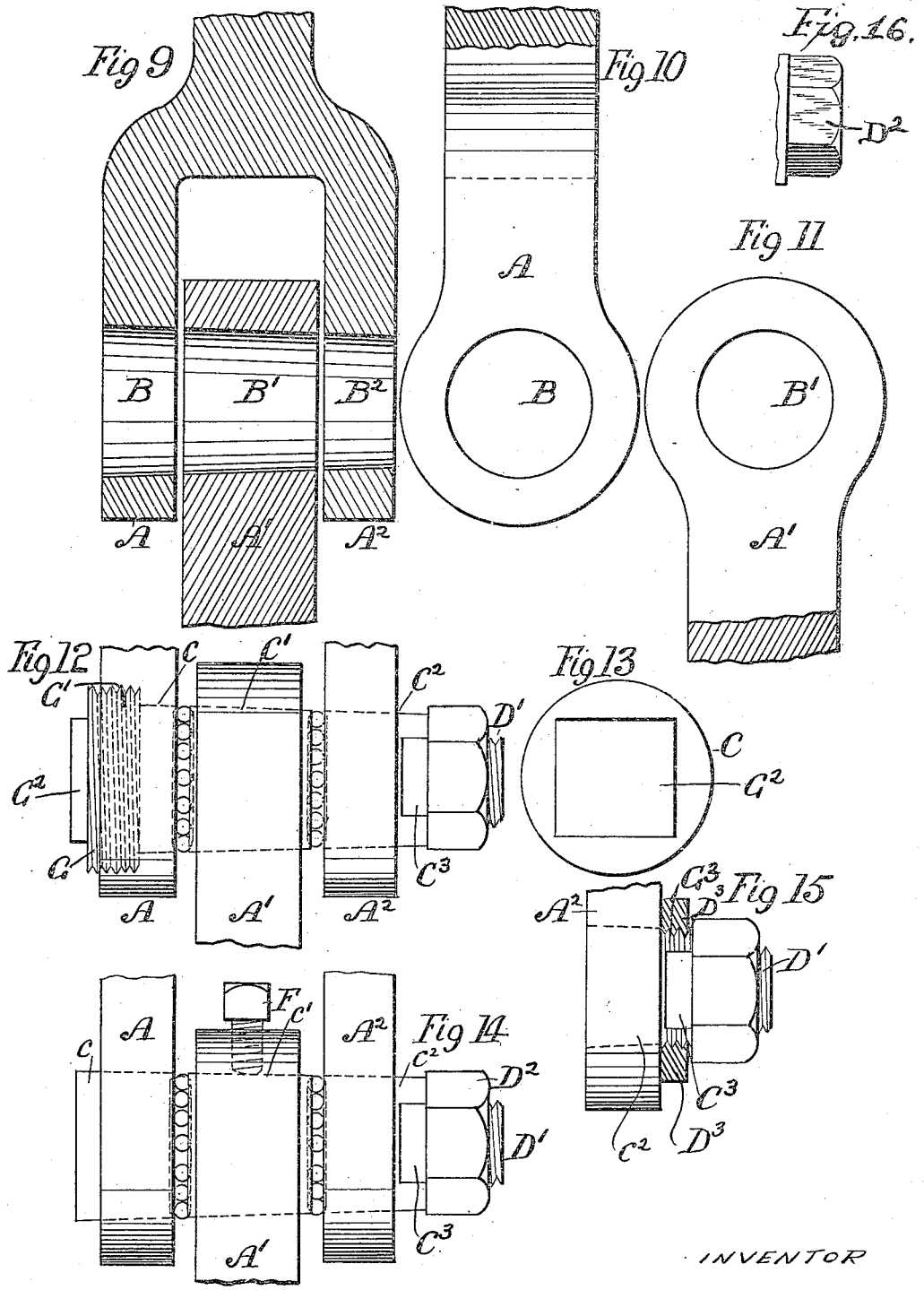

SAMUEL GEORGE MASON, OF MOSELEY, NEAR BIRMINGHAM, ENGLAND.

BALL-BEARING JOINT.

946,061. Specification of Letters Patent. Patented Jan. 11, 1910.

Application filed September 10, 1907. Serial No. 392,233.

*To all whom it may concern:*

Be it known that I, SAMUEL GEORGE MASON, a subject of His Majesty the King of England, residing at Harvington, St. Agnes Road, Moseley, near Birmingham, in the county of Worcester, England, brass-founder, have invented new and useful Improvements in or Relating to Ball-Bearing Joints, of which the following is a specification.

This invention relates to an improved method of providing a self contained adjustable ball bearing joint, applicable to all purposes where such a joint or joint connection as hereinafter described may be used in machinery or for mechanical construction and appliances, and my object is to provide a joint that is capable of being readily, accurately and securely fitted together in the first instance, and which can be easily adjusted as may be required when its parts become loose in use either through vibration, or wear or otherwise.

Hitherto the method of making ball bearing joints has been by forming the "joint pin" that is the central or axial portion, of a spindle or turned cylindrical pin parallel from end to end, and also the corresponding apertures in the connected parts have been bored or formed of equal size and corresponding parallel shape. Such a construction does not allow of the parts forming the joint being adjusted as they become worn, and thus they are apt to work loose.

By my invention this disadvantage is entirely overcome as will be clearly shown.

Referring to the drawings which form a part of this specification Figure 1 represents in front elevation a complete ball bearing joint constructed according to my invention, the connected parts are shown broken off for convenience of illustration, moreover these parts may be of any desired configuration independent of the joint, according to the purpose for which the joint or joint pin may be intended. Fig. 2, represents a side elevation of the joint. Fig. 3, shows the central axial portion or portions forming the joint pin as a whole, detached. Fig. 4, shows the central pin or spindle detached. Fig. 5, represents in side elevation the smaller tapered or conical part showing flat portions for screwing on this part to the central spindle. Fig. 6, represents the center tapered or conical part and the smaller tapered part of the axial portion shown in position in section, the smaller tapered part in such a position as to show the flat portions. Fig. 7, is a sectional view at Z. Z. in Fig. 4 through the center spindle, showing the ball race and balls. Fig. 8, is a view of the center tapered or conical part, looking from Y Y Fig. 6 and showing the ball race. Fig. 9, Sheet 2, represents a sectional view through the joint fork and eye, showing the taper or conical shape of the apertures as drilled to receive the axial portion or portions forming the same. Fig. 10, is a side elevation of the fork. Fig. 11, is a side elevation of the center member or eye. Fig. 12, represents a front elevation of the complete joint, showing as a modification one of the axial portions with a screw thread to take into the fork. Fig. 13, is an end elevation of the said axial portion shown in Fig. 12 showing a square for the wrench for screwing. Fig. 14, represents a front elevation of a further modification of the joint, with a set screw pin to secure the center part. Fig. 15, represents a further modification of the screw arrangement. Fig. 16 is a detail view of a modification.

The parts or members forming the body of the joint, A. A$^1$. A$^2$. are drilled with a Morse or other kind of tapered drill, to form the tapered or conical apertures B. B$^1$. B$^2$. and the ball bearing center or axial portion or portions C. C$^1$. C$^2$. forming the joint pin, is or are formed taper or conical and of the same sizes as the drilled tapered or conical apertures B. B$^1$. B$^2$. of the fork and eye A. A$^1$. A$^2$. into which they fit.

In the usual form of construction of my improved joint, as shown in Figs. 1 to 11 inclusive, the central axial portion or joint pin C. C$^1$. C$^2$. is driven or forced into the apertures B. B$^1$. B$^2$. by blows of a hammer, or by screw pressure, hydraulic pressure, or otherwise, and when once driven or forced in remains fixed by friction, as the angle of taper is such as will allow this. Any slackening that may take place will be the result of vibration or of stretching of the metal. If such slackening takes place the central axial portion or joint pin C. C$^1$. C$^2$. is tightened up in the apertures B. B$^1$. B$^2$. by the same means as were first employed to fix it.

It will be observed that the tapered end C forms an integral part of the center spindle or pin D, and that the tapered portion C$^1$. can be rotated and the part C$^2$. can be screwed upon the spindle, all three parts C. C¹. C². being tapered or conical. The spindle D is screw threaded at D¹. in part of its length for the adjustment of the loose tapered parts C¹. C². of the axial portion or joint pin.

The opposite faces of the tapered or conical parts C. C¹. C². are provided with the usual ball races E and balls E¹. Thus in case of the ball joint becoming worn, the parts of the same can readily be adjusted, as in the first instance, by tightening up the tapered or conical parts C¹. C². Thus is accomplished by screwing the part C². a little farther on to the pin D. and then locking it by means of the nut D². The nut D². acts only as a lock nut, and as shown in full lines in the drawings it would not be put on until the central axial portion is forced into the members A. A¹. A². of the joint, as it is too large to pass through the aperture B². But this nut D² may be made smaller across its corners as shown in Fig. 16, so that the central axial portion C. C¹. C². with the balls E¹. E¹. may all be fitted together and adjusted, and then locked by the nut D², thus forming a complete tapered or conical central axial portion or joint pin. This is the method of manufacture which I prefer.

The tapered part C². has flat sides C³. for adjustment by a wrench, or other means may be adopted as holes into which a spanner fits.

The tapered or conical parts, C. C¹. C². can either be finished plain or be simply driven or forced into the apertures B. B¹. B². as already described, or one or more of the parts may be screw threaded to take into corresponding parts in the outer members of the joint. Fig. 12 shows such screw threads G on the part C which threads take into corresponding screw threads in a recessed ring or annular space G¹. in the member A. By screwing part G into the member A the whole of the taper axial portion is forced into the apertures B. B². in the fork A. A². This is done when the joint is first put together, and as there is no wear on these parts they can only become loose from vibration, or from stretching of the metal. In this case the central taper or conical axial portion can be brought back to its original position by tightening up C and C² in B and B² by screwing in G¹ by means of the square G². Or instead of the screw thread G being upon the tapered part C a screw may be formed upon the smallest tapered part C² as shown at G³ in Fig. 15, and a nut D³ used to tighten up the same, the effect of screwing up this nut will be to draw the entire tapered axial portion or joint pin closely into the apertures B and B² of the fork A. A². And in order that this tightening up may also take place in the aperture B¹. of the central member or eye A¹ a temporary wedge or packing must be drawn between A¹ and A².

A small set screw F may be used as in Fig. 14 for additional security of the joint. This is shown in the drawing as only applied to the central member A¹. of the joint, but similar screws may be placed in the other members if found desirable, or other convenient means, such as squaring or shouldering the engaging parts, may be employed for securing the center tapered axial portion in the fork A. A² and eye A¹ of the joint.

The screw threads G, the set screw F or the squaring or the shouldering of the engaging parts are only minor details in connection with my invention and may be used or not, or may be convenient in any particular application.

I would have it understood that the body of the joint shown at A. A¹. A². in the drawings is only one method which I may employ, as applied to a lever arm or the like. But I may vary the configuration of the body of the joint as may be required and the joint may be horizontal as shown, vertical or inclined, without in any degree departing from the essential features of my invention.

The central axial portion or adjustable joint pin may be applied either to a joint where the motion is reciprocating as illustrated or where the motion is continuously rotative.

Having now described my invention what I claim as new and desire to secure by Letters Patent is:—

1. An adjustable joint for machinery having the members to be joined provided with tapered apertures, tapered axial portions fitting into said apertures, balls between said portions, a central spindle carrying said portions, and means for locking the portions on the spindle, said portions, when assembled, forming a member tapering from one end to the other.

2. An adjustable joint for machinery having the members to be joined provided with tapered apertures, a spindle having a tapered portion at one end and its other end screw threaded, a tapered intermediate sleeve adapted to be carried by the spindle, and a tapered end sleeve having its interior screw threaded to receive the screw threaded end of the spindle, balls located between the tapered portion and the intermediate sleeve and between the intermediate sleeve and the end sleeve, and a nut engaging the threaded end of the spindle for holding the parts in position, said tapered portion of this spindle and the two sleeves forming, when assembled, a member tapering from one end to the other.

3. An adjustable joint for machinery having the members to be joined provided with tapered apertures, a spindle having a tapered head and a screw threaded end, a tapered intermediate sleeve and a tapered end sleeve adapted to engage with the screw threads on the spindle, said head and the sleeves, when assembled, forming a member tapering from one end to the other, and means for holding the spindle and sleeves in the tapered apertures.

4. An adjustable joint for machinery having the members to be joined provided with tapered apertures, a spindle having a tapered head, said head having screw threads thereon engaging with screw threads on one of said members, a tapered intermediate sleeve, a tapered end sleeve, and means for holding said sleeves on the spindle.

In testimony whereof I have signed my name to this specification in the presence of two subscribing witnesses.

SAMUEL GEORGE MASON.

Witnesses:
    EDWD. BURTON PAYNE,
    PERLY DENSTON.